United States Patent
Malanga et al.

(10) Patent No.: US 6,815,474 B2
(45) Date of Patent: Nov. 9, 2004

(54) WATER-BASED INTAGLIO PRINTING INK

(75) Inventors: Joseph Malanga, Clark, NJ (US); Solomon J. Nachfolger, Monsey, NY (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/961,887

(22) Filed: Sep. 24, 2001

(65) Prior Publication Data

US 2002/0107309 A1 Aug. 8, 2002

Related U.S. Application Data

(63) Continuation-in-part of application No. 08/489,918, filed on Jun. 13, 1995, now abandoned.

(51) Int. Cl.⁷ .............................. C08K 5/05; C09D 11/10
(52) U.S. Cl. ..................... 523/414; 523/423; 523/456; 106/31.75; 106/31.85
(58) Field of Search ................... 523/414, 423, 523/456; 106/31.75, 31.85

(56) References Cited

U.S. PATENT DOCUMENTS

| | | | |
|---|---|---|---|
| 4,166,054 A | 8/1979 | Meeske et al. | ............... 260/23 |
| 4,966,628 A | 10/1990 | Amon et al. | ................... 106/30 |
| 5,100,934 A | 3/1992 | Glesias | ........................ 523/456 |
| 5,367,005 A | 11/1994 | Nachfolger | ................. 523/403 |
| 5,723,514 A | * 3/1998 | Nachfolger et al. | ..... 106/31.13 |

* cited by examiner

*Primary Examiner*—D. R. Wilson
(74) *Attorney, Agent, or Firm*—Sidney Persley

(57) ABSTRACT

The invention relates to a water-based intaglio printing ink especially suited for the intaglio printing of security documents, such as postage stamps, stock certificates and the like, wherein the water-based intaglio printing ink having a) an epoxy resin ester reacted with an unsaturated monobasic acid and a reactive monomer, b) a glycol and/or glycol ether c) a pigment, d) a monoalkanolamine, e) a drier and f) water.

16 Claims, 4 Drawing Sheets

WATER-BASED INTAGLIO PRINTING INK

This application is a continuation-in-part of U.S. patent application Ser. No. 08/489,918, filed Jun. 13, 1995, now abandoned, entitled "INTAGLIO PRINTING INK", which is hereby incorporated by reference in its entirety.

BACKGROUND OF THE INVENTION

Field of the Invention

The invention relates to a heatset printing ink for the printing of documents by intaglio printing, i.e., engraved steel die printing. The ink has been found to be especially useful for the printing of security documents such as stamps, checks, stock certificates, bank notes, tickets, etc.

The term "intaglio printing" refers to a printing process wherein a printing cylinder or printing plate carries the engraved pattern and the engraved recess is filled with printing ink to be transferred to the printing substrate in order to create the document. In this type of printing, typically a rotating engraved cylinder (usually manufactured from steel or nickel and plated with chromium) is supplied with ink by one or more template inking cylinders by which a pattern of inks of different color is transferred to the printing cylinder. Any excess ink on the surface of the cylinder is then wiped off by a rotating wiper cylinder covered by a plastisol, using a dilute aqueous solution of sodium hydroxide and sulfonated castor oil as an emulsifying medium for the wiped-off excess ink. Thereafter, the printing pattern is transferred, under a pressure of up to 105 kg/cm, to the substrate.

The most widespread process for printing security documents, especially currency, is sheetfed non-heatset sheetfed intaglio. Sheetfed non-heatset intaglio inks are based on oxidizable resins and alkyds and are very slow drying. Typically, one side of the currency is printed first and after 24–48 hours, the other side is printed. The typical printing speed of sheetfed intaglio is about 45–75 m/min. U.S. Pat. No. 4,966,628 discloses sheetfed intaglio inks suitable for printing of security documents.

Recently, patents disclosing heatset intaglio printing inks suitable for printing of security documents have issued to the same assignee of the present invention, e.g. see U.S. Pat. Nos. 5,100,934 issued Mar. 31, 1992 (hereinafter the "'934 patent") and 5,367,005 issued Nov. 22, 1994. Both patents describe printing ink formulations, which have proven to provide excellent performance in respect to the heatset intaglio printing of currency. However, the inks disclosed in both patents exhibit either relatively high percentages of volatile organic compounds ("VOC") or are able to tolerate only small amounts of water.

For example, the "curing agent" of the '934 patent is an amine selected to promote the crosslinking of the resin, in effect the formation of a polymeric network of the resin for certain resistance properties in its intended application, with diamines being preferred. The curing agent disclosed by the '934 patent when used as a neutralizing agent forms a resulting crosslinked resin or polymeric network which offers little water tolerance.

Thus, until the present invention, efforts to reduce the VOC content of the heatset intaglio inks, or increase the water tolerance of such inks, have failed. Reducing the content of volatile solvents or substituting water for part of the volatile solvents have resulted in incompatibility problems because of the nature of the resins present in such inks.

SUMMARY OF THE INVENTION

It has now been found that it is possible to replace part of the VOCs in heatset intaglio printing inks with water, thereby dramatically reducing the VOC content of such inks, while at the same time avoiding incompatibility problems, which would otherwise occur because of the presence of water in such inks. The solution to this problem is that a monoalkanolamine is employed in the inks of the present invention, instead of the diamine curing agents employed in the inks disclosed in the '934 patent. As will be apparent from the examples set forth below, the tolerance of the heatset intaglio printing inks for water is significantly and surprisingly improved, up to 50–100 fold over the prior art intaglio printing ink compositions (e.g. the '934 patent) as a result of the presence of the alkanolamine.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
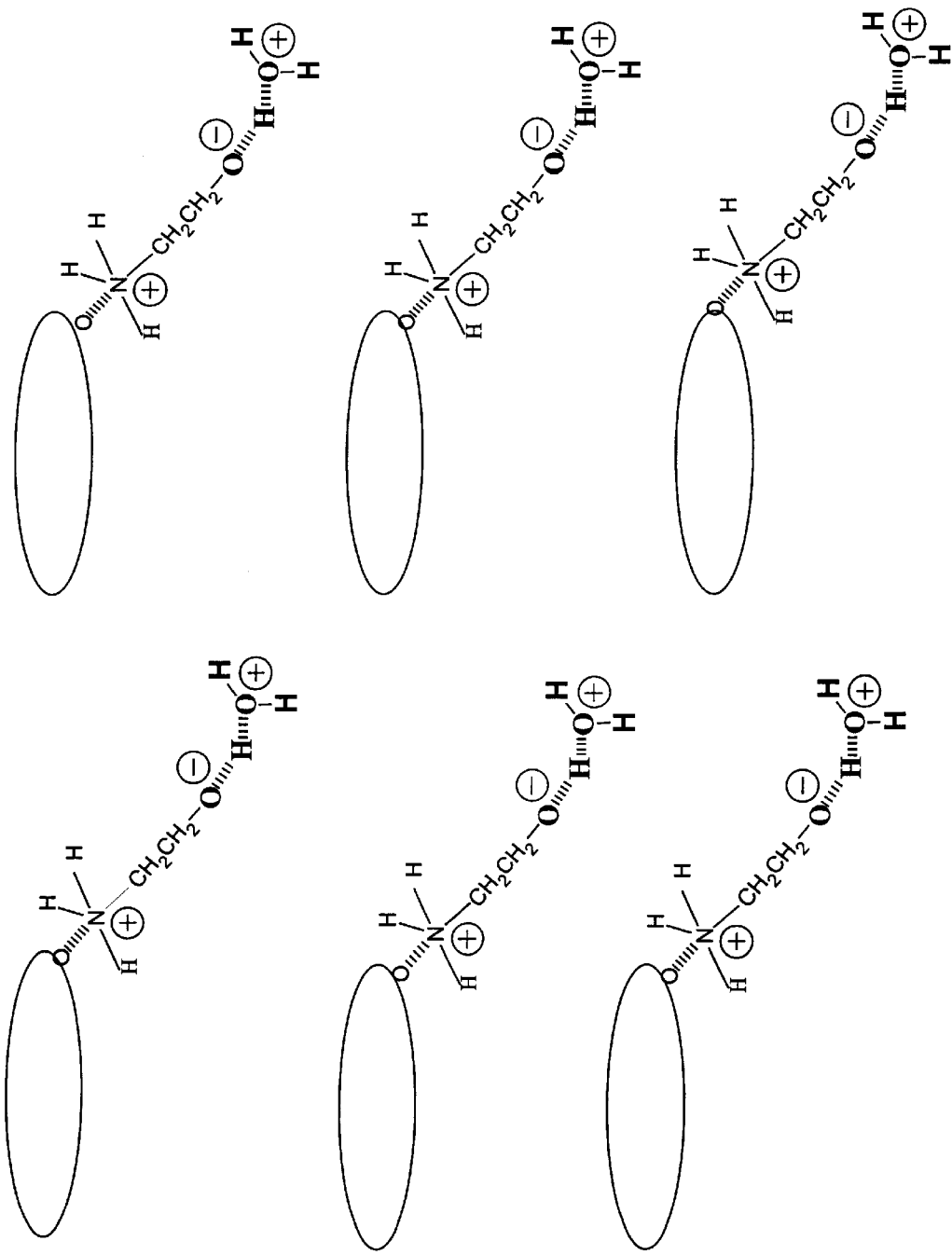
FIG. 1 is a depiction of the EPoTUF resin salt after neutralization with monoethanolamine (MEA) as the neutralizing amine and water.

The water-based intaglio printing inks of the present invention consist essentially of:

a) a resin present in an amount of about 15 to 40 wt. %, preferably 20 to 35 wt. %, based on the weight of the ink, comprising the product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10, and (ii) about 35–25 parts per hundred of a mixture of about 20–28 wt. % of one or more unsaturated monobasic acids having a polymerizable double bond and about 80–72 wt. % of one or more reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8; preferably n has an average value of about 2.2:

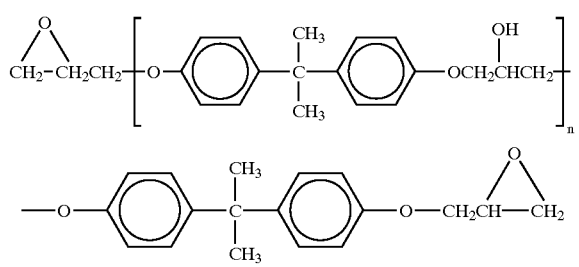

b) at least one glycol and/or glycol either present in an amount of about 10 to 30 wt. %, preferably 15 to 25 wt. %, based on the weight of the ink;

c) at least one inorganic and/or organic pigment present in an amount of about 3 to 30 wt %, preferably 5–28 wt. %. based on the weight of the ink;

d) a monoalkanolamine having 2 to 8, preferably 2 to 5 carbon atoms, wherein the amino group is primary, secondary or tertiary, preferably primary; the monoalkanol-amine is present in an amount of about 0.1 to 10 wt. %, preferably 1 to 3 wt. %, based on the weight of the ink;

e) at least one drier, present in an amount of about 0.1 to 5 wt. %, preferably 0.5 to 4 wt. %, based on the weight of the ink; and f) water, present in an amount of about 5 to 20 wt. %, preferably 10 to 20 wt. %, based on the weight of the ink.

Drying oil partially conjugated unsaturated fatty acids which are useful for esterifying the epoxy resin are those available from safflower oil, sunflower oil, tung oil, canola oil, tall oil, dehydrated castor oil, soya bean oil, oiticica oil, plukenetia oil, perilla oil, hemp-seed oil, walnut oil, tobacco seed oil and linseed oil.

Typically the esterification of the epoxy resin with the drying oil partially conjugated unsaturated fatty acid is carried out at a temperature of about 220'–240'C. and continued until an acid number below 10 is obtained. The ester is then dissolved in a glycol ether such as ethylene glycol monobutyl ether to a concentration of 60% nonvolatile and a Gardner-Holdt viscosity of K-N.

The 60% non-volatile solution of the esterified epoxy resin is thereafter reacted with a mixture of 20–28% by weight of one or more unsaturated monobasic acids having a polymerizable double bond and 80–72% by weight of one or more reactive monomers having a polymerizable double bond.

Suitable monobasic acids include acrylic acid, methacrylic acid, crotonic acid and vinylacetic acid.

Suitable reactive monomers include styrene, vinyl toluene and the acrylic and methacrylic acid esters of $C_1$–$C_{10}$, alcohols such as methyl, ethyl, propyl, isopropyl, butyl, isobutyl and 2-ethylhexyl.

Typically, 65–75 parts of the esterified epoxy resin will be reacted with 35–25 parts of the mixture of unsaturated monobasic acids and reactive monomers. The reaction between the esterified epoxy resin and such mixture may be carried over a two hour period at a temperature of about 120 to 150° C. in the presence of about 1–6 wt % of a peroxide catalyst such as di-tertiary butyl peroxide, benzoyl peroxide, cumene peroxide, tertiary butyl perbenzoate, tertiary butyl hydroperoxide, and the like. The resultant solution is then typically neutralized with an amine to a pH of about 5 to 9 to make it water dilutable.

Resins of the type employed in the intaglio printing inks of the present invention are well known and may be prepared in accordance with the teachings of U.S. Pat. No. 4,166,054 to Charles J. Meeske et al. and assigned to Reichhold Chemicals, Inc., and incorporated herein by reference. These resins are commercially available; a useful example of Resin A is Reichhold Chemicals' Epotuf®Epoxy Ester Resin 92-737 dissolved in a suitable solvent such as diethylene glycol monobutyl ether and is hereinafter referred to as "Varnish 90-164". This varnish contains 70±2% non-volatiles, has an acid number of 54–60 and a Gardner-Holdt viscosity of $Z_7$–$Z_8$.

Suitable glycols and glycol ethers include ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

The pigment may be any desired inorganic and/or organic pigment suitable for heatset intaglio printing such as Cl Pigment Yellow 12, Cl Pigment Yellow 42, Cl Pigment Black 7, Cl Pigment Black 11, Cl Pigment Red 9, Cl Pigment Red 22, Cl Pigment Red 23, Cl Pigment Red 57:1, Cl Pigment Red 67, Cl Pigment Red 146, Cl Pigment Red 224, Cl Pigment Green 7, Cl Pigment Green 36, Cl Pigment Blue 15:3, Cl Pigment Violet 23 and Cl Pigment Violet 32.

Figure 2:
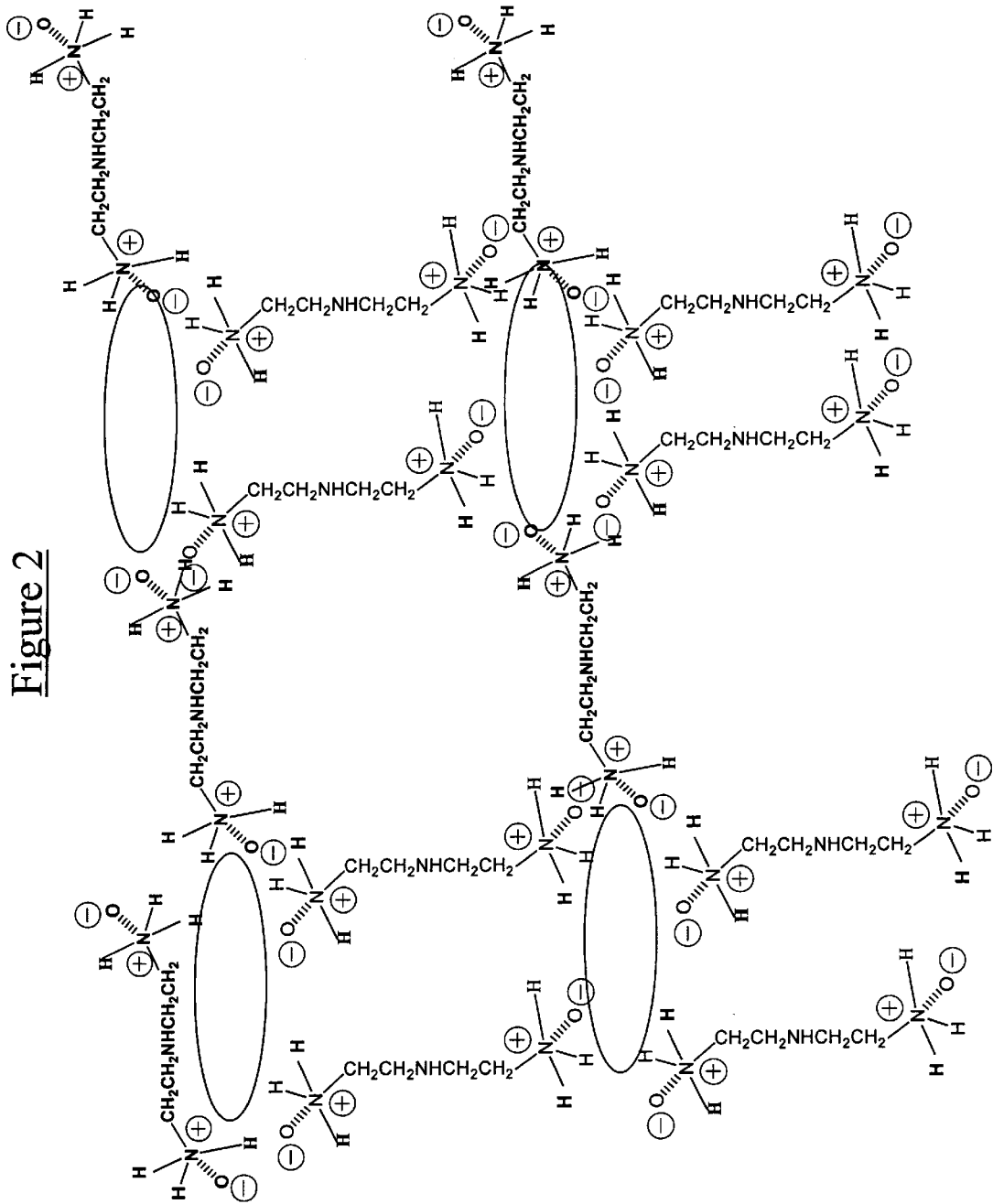
FIG. 2 is a depiction of the EPoTUF resin network formed after the crosslinking of the resin by and through the addition of diethylenetriamine (DETA) as the neutralizing amine and water.
Figure 3A:
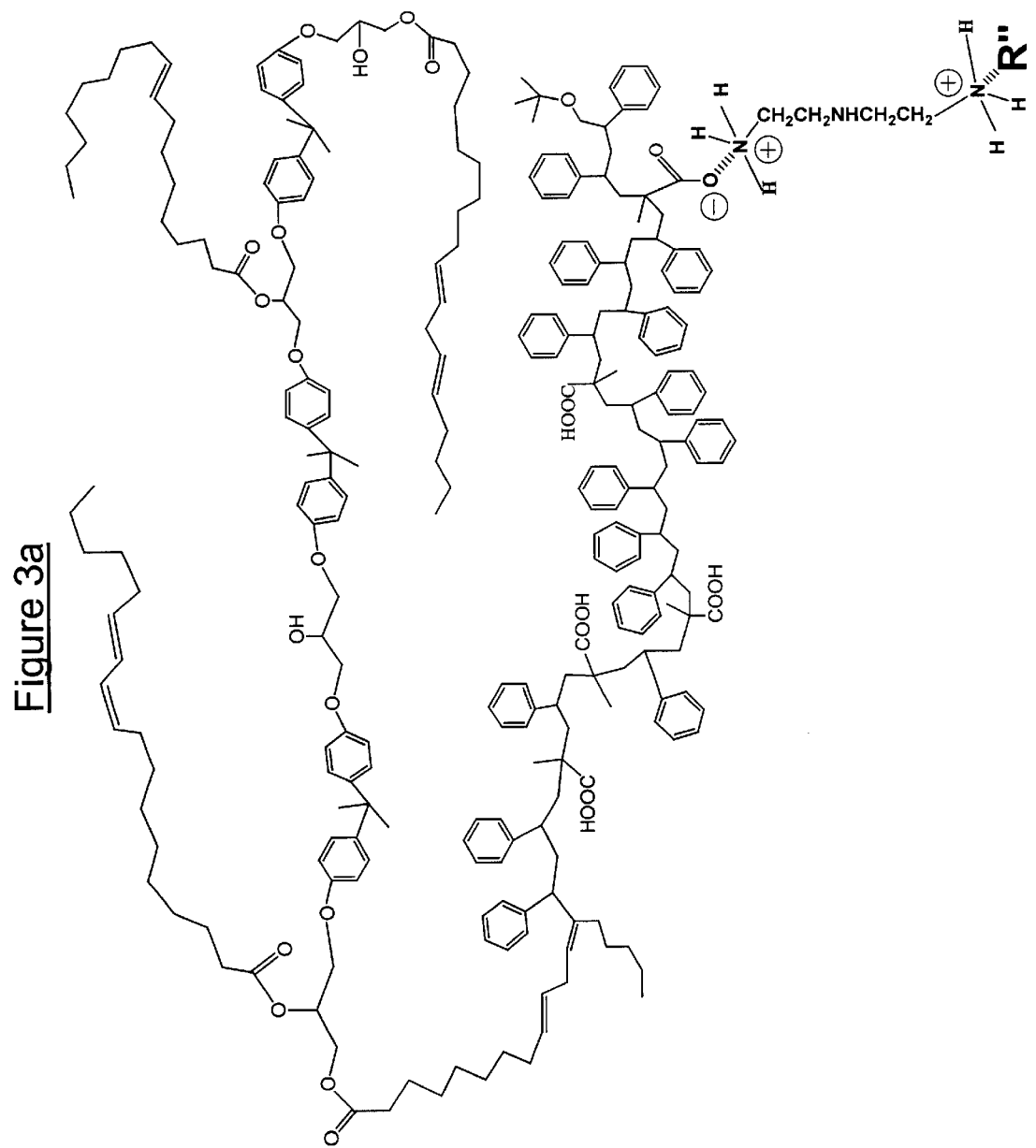
FIG. 3 is a depiction of the chemical structure of the EPoTUF resin and the resultant crosslinking of the EPoTUF resin by and through the addition of diethylenetriamine (DETA) as the neutralizing amine and water.
Figure 3B:
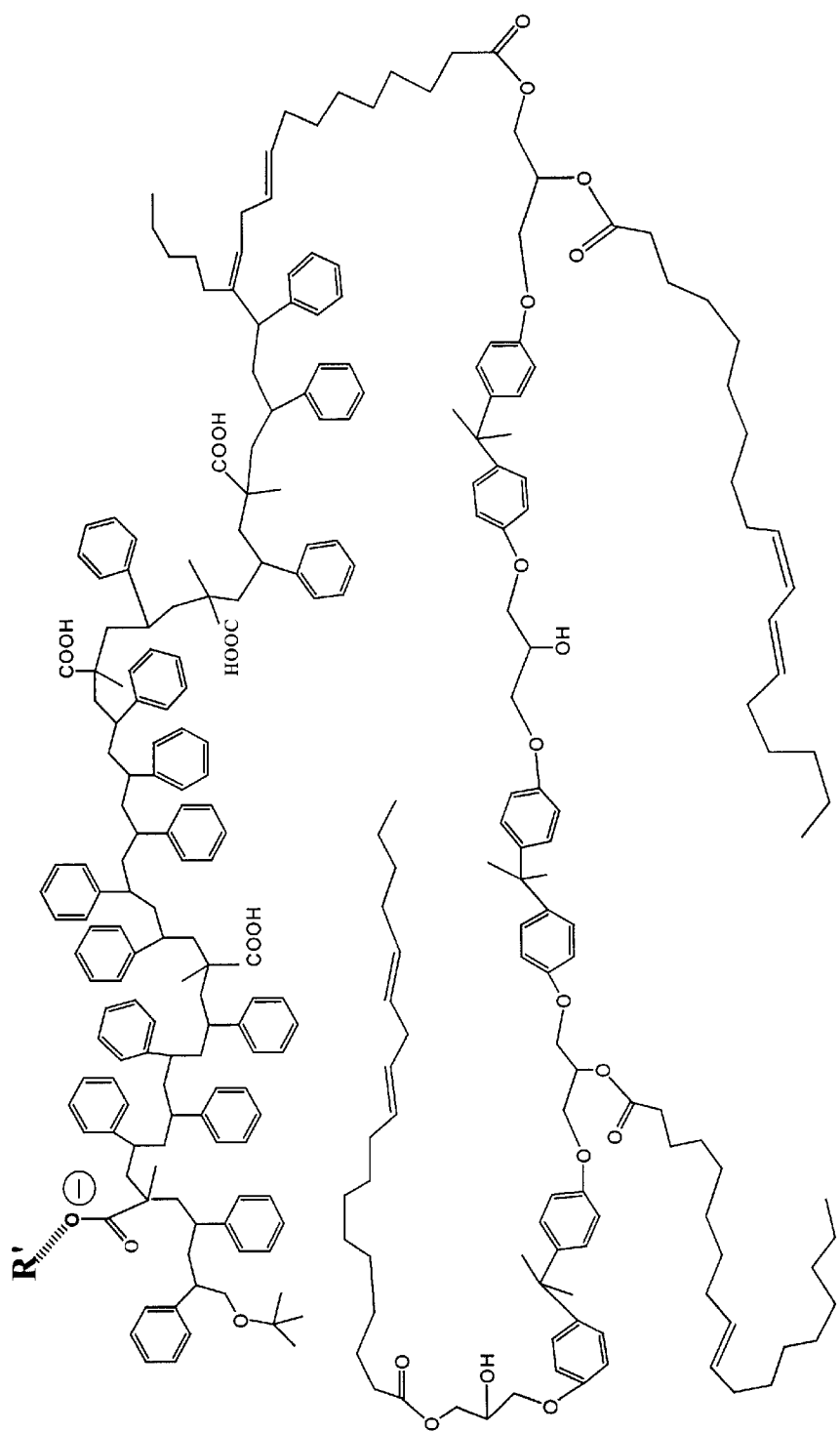

Suitable monoalkanolamines include ethanolamine (which is preferred), 3-amino-i-propanol, 4-amino-l-butanol, 5-amino-1-pentanol, 6-amino-1-hexanol, 2-(methylamino)ethanol, N,N-dimethylaminoethanolamine, and the like. The monoalkanolamines are used to neutralize the resin, as illustrated in FIG. 1. Multifunctional amines, such as diamines, are not desired because they promote premature crosslinking of the resin, resulting in a resin crosslinked network, as shown in FIGS. 2 and 3.

Suitable driers are the heavy metal salts of complex fatty acids, present singly or as mixtures. Examples of useful driers are the octoates, resinates, naphthenates, neodecanoates, tallates and linoleates and mixtures thereof of metals such as cobalt, magnesium, manganese, zinc, cerium, zirconium and mixtures thereof. If desired, a small amount, e.g. 0.1–1.0 wt. %, based on the weight of the ink, of a drier activator may be included in order to enhance the activity of the drier; a suitable drier activator is 2,21-bipyridyl. Preferably, the ink will contain one or more fillers in an amount of about 1 to 35 wt. %, based on the weight of the finished ink. Suitable fillers include china clay, calcium carbonate, calcium sulfate, talc, silica, corn starch, titanium dioxide, alumina and mixtures thereof. The ink may also contain about 1 to 5 wt. %, based on the weight of the finished ink, of a wax to improve scuff resistance. Suitable waxes include polytetrafluoroethylene waxes, polyethylene waxes, Fischer-Tropsch waxes, silicone fluids and mixtures thereof.

The finished inks will typically have a viscosity in the range of 2 to 30 poise at 40'C. and 100 second$^{-1}$ shear rate and may be printed at speeds of up to 200 m/min. The inks dry rapidly—typically the imprinted substrate will be cured in ovens of 5–6 meters in length at temperatures of 80 to 180'C. and a residence time of 0.1 to 2 seconds. Thus a second color may be printed almost instantaneously upon a previously-printed color.

The following examples shall serve to illustrate the instant invention. Unless otherwise indicated, all parts and percentages are by weight.

EXAMPLES 1–5

Five Intaglio printing inks having the colors set forth in Table I were prepared by combining the indicated ingredients and thereafter grinding the mixture on a 3-roll mill until a 4/2 grind was obtained. The properties of the five inks are shown in Table II.

TABLE I

|  | Purple | Black | Red | Brown | Blue |
|---|---|---|---|---|---|
| Varnish 90–164 | 35.0 | 35.0 | 39.0 | 40.3 | 34.9 |
| Butyl Carbitol | 7.0 | 7.0 | 7.0 | 7.3 | 6.2 |
| CI Pigment Black 11 | — | — | — | 5.3 | — |
| CI Pigment Black 7 | 0.1 | 5.0 | — | 0.7 | 0.1 |
| CI Pigment Blue 15:3 | 1.0 | — | — | — | 4.7 |
| CI Pigment Violet 23 | 0.8 | — | — | — | 0.8 |
| CI Pigment Red 22 | — | — | 4.0 | — | — |
| CI Pigment Red 57:1 | — | — | 1.5 | — | — |
| CI Pigment Red 23 | — | — | — | 0.7 | — |
| CI Pigment Red 67 | 3.3 | — | — | — | — |
| 5% Cobalt Neodeconate Drier | 0.4 | 0.4 | 0.4 | 0.4 | 0.4 |
| 55% Manganese Neodeconate Drier | 0.4 | 0.4 | 0.4 | 0.4 | 0.4 |
| 2,2'-Bipyridyl Drier Activator | 0.2 | 0.2 | 0.2 | 0.2 | 0.2 |
| Dodecylbenzyl Sulfonate Surfactant | 1.0 | 1.0 | 1.0 | 1.2 | 1.1 |
| Water | 18.0 | 18.4 | 16.9 | 15.5 | 18.6 |
| Monoethanolamine | 1.6 | 1.6 | 1.8 | 1.8 | 1.6 |
| Polyethylene Wax | 3.0 | 3.0 | 3.0 | 3.0 | 3.0 |
| Calcium Carbonate | 28.2 | 28.0 | 24.8 | 23.2 | 28.0 |

TABLE II

|  | Purple | Black | Red | Brown | Blue |
|---|---|---|---|---|---|
| % Water | 18.0 | 18.4 | 16.9 | 15.5 | 18.6 |
| % Volatile Organic Compounds | 19.6 | 19.6 | 21.0 | 21.7 | 18.8 |
| Total % Volatiles | 37.6 | 38.0 | 37.9 | 37.2 | 37.4 |
| Total % Solids | 62.4 | 62.0 | 62.1 | 62.8 | 62.6 |
| Viscosity @ 40° C., 100 second$^{-1}$ shear rate, poise | 11.9 | 11.1 | 12.3 | 10.7 | 8.1 |

EXAMPLES 6–9

Monoethanolamine was evaluated against diethylenetriamine and 3-amino-1-propanol and 4-amino-1-butanol for water tolerance in solvent based heatset intaglio pirinting inks using the EPoTUF resin prepared according to the invention of Meeske et al, U.S. Pat. No. 4,166,054 (Batch #EC 2812 with an acid number of 41.0). The EPoTUF resin was neutralized with 110% (excess amine) for each evaluation. After the addition of the respective amines, the 70% solids EPoTUF resin in butylcarbitol was diluted with butyl carbitol prior to the water titration (64% of the neutralized EPoTUF plus 36% butyl carbitol by weight %). The evaluation was performed on the basis of when cloud-point was detected. The final water toleration results are shown in Table III.

EXAMPLE 6

| EPoTUF resin | 250.0 g |
|---|---|
| Monoethanolamine | 12.3 g |

The above two materials, EPoTUF resin (a modified epoxy ester resin solution prepared according to the invention in Meeske et al.) and monoethanolamine (formula weight 61.08) were air mixed at moderate speed for 15 minutes at 49 C. The resulting neutralized resin-amine compound was mixed and diluted with butyl carbitol on a 64% to 36% by weight % ratio. Titration was then performed using water to determine when a cloudpoint was reached. The water toleration result is shown in Table III.

EXAMPLE 7

| EPoTUF resin | 250.0 g |
|---|---|
| Diethylenetriamine | 6.9 g |

The above two materials, EPoTUF resin (a modified epoxy ester resin solution prepared according to the invention in Meeske et al.) and diethylenetriamine (formula weight 103.17) were air mixed at moderate speed for 15 minutes at 49 C. The resulting neutralized resin-amine compound was mixed and diluted with butyl carbitol on a 64% to 36% by weight % ratio. Titration was then performed using water to determine when a cloudpoint was reached. The water toleration result is shown in Table III.

EXAMPLE 8

| EPoTUF resin | 250.0 g |
|---|---|
| 3-amino-1-propanol (99%) | 15.1 g |

The above two materials, EPoTUF resin (a modified epoxy ester resin solution prepared according to the invention in Meeske et al.) and 3-amino-1-propanol (amine formula weight 75.11) were air mixed at moderate speed for 15 minutes at 46 C. The resulting neutralized resin-amine compound was mixed and diluted with butyl carbitol on a 64% to 36% by weight % ratio. Titration was then performed using water to determine when a cloudpoint was reached. The water toleration result is shown in Table III.

EXAMPLE 9

| EPoTUF resin | 250.0 g |
|---|---|
| 4-amino-1-butanol (98%) | 1.8 g |

The above two materials, EPoTUF resin (a modified epoxy ester resin solution prepared according to the invention in Meeske et al.) and 4-amino-1-butanol (amine formula weight 89.14) were hand mixed at moderate speed for 15 minutes at 46 C. (???). The resulting neutralized resin-amine compound was mixed and diluted with butyl carbitol on a 64% to 36% by weight % ratio. Titration was then performed using water to determine when a cloudpoint was reached. The water toleration result is shown in Table III.

TABLE III

| Amine | Water Toleration (of Amine/EPoTUF) |
|---|---|
| Monoethanolamine (Ex. 6) | >100 ml |
| Diethylenetriamine (Ex. 7) | 2.1 ml |
| 3-amino-1-propanol (Ex. 8) | >100 ml |
| 4-amino-1-butanol (Ex. 9) | >100 ml |

While the foregoing is directed to embodiments of the present invention, other and further embodiments of the invention may be devised without departing from the basic scope thereof, and the scope thereof is determined by the claims that follow.

What is claimed is:

1. A water-based heatset intaglio printing ink consisting essentially of:
   a) a resin present in an amount of about 15 to 40% based on the weight of the ink, comprising the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10, and (ii) about 35–25 parts per hundred of a mixture of about 20–28% by weight of one or more unsaturated monobasic acids having a polymerizable double bond and about 80–72% by weight of one or more other reactive monomers having a polymerizable, said epoxy resin comprising the condensation product of bisphenol A and epichlorohydrin and having an epoxide equivalent weight of about 400–1100 and represented by the structure below wherein n has a value of 0 to about 8:

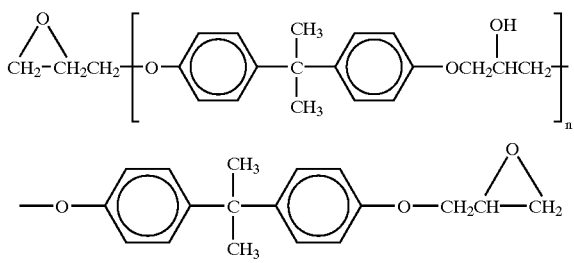

b) at least one glycol and/or glycol ether present in an amount of about 10–30% based on the weight of the ink;
   c) at least one inorganic and/or organic pigment present in an amount of about 3 to 30% based on the weight of the ink;
   d) at least one monoalkanolamine having 2 to 8 carbon atoms, wherein the amino group is a primary, secondary or tertiary amino group, said monoalkanolamine being present in an amount of about 0.1 to 10% based on the weight of the ink;
   e) at least one drier, present in an amount of about 0.1 to 5 wt % based on the weight of the ink; and
   f) water, present in an amount of about 5 to 20% based on the weight of the ink.

2. The ink-of claim 1 wherein the amino group is a primary amino group.

3. The ink of claim 2 wherein the monoalkanolamine is selected from the group consisting of ethanolamine, 3-amino-l-propanol, 4-amino-l-butanol, 5-amino-l-pentanol and 6-amino-l-hexanol.

4. The ink of claim 3 wherein the monoalkanolamine comprises ethanolamine.

5. The ink of claim 1 wherein n has an average value of about 2.2.

6. The ink of claim 1 wherein the drying oil partially conjugated unsaturated fatty acid is obtained from an oil selected from the group consisting of safflower oil, sunflower oil, tung oil, canola oil, tall oil, dehydrated castor oil, soya bean oil, oiticica oil, plukenetia oil, perilla oil, hempseed oil, walnut oil, tobacco seed oil and linseed oil.

7. The ink of claim 1 wherein the monobasic acid is selected from the group consisting of acrylic acid, methacrylic acid, crotonic acid and vinylacetic acid.

8. The ink of claim 1 wherein the reactive monomers are selected from the group consisting of styrene, vinyl toluene, the acrylic esters of $C_1$–$C_{10}$ alcohols, and the methacrylic esters of $C_1$–$C_{10}$ alcohols.

9. The ink of claim 1 wherein the glycol and/or glycol ether is selected from the group consisting of ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

10. The ink of claim 1 wherein the pigment is selected from the group consisting of Cl Pigment Yellow 12, Cl Pigment Yellow 42, Cl Pigment Black 7, Cl Pigment Black 11, Cl Pigment Red 9, Cl Pigment Red 22, Cl Pigment Red 23, Cl Pigment Red 57:1, Cl Pigment Red 67, Cl Pigment Red 146, Cl Pigment Red 224, Cl Pigment Green 7, Cl Pigment Green 36, Cl Pigment Blue 15:3, Cl Pigment Violet 23 and Cl Pigment Violet 32.

11. The ink of claim 1 including a filler present in an amount of about 1 to 35 wt. %, based on the weight of the ink, said filler being selected from the group consisting of china clay, calcium carbonate, calcium sulfate, talc, silica, corn starch, titanium dioxide, alumina and mixtures thereof.

12. The ink of claim 1 including a wax present in an amount of about 1 to 5 wt. %, based on the weight of the ink, said wax being selected from the group consisting of polytetrafluoroethylene waxes, polyethylene waxes, Fischer-Tropsch waxes, silicone fluids and mixtures thereof.

13. The ink of claim 1 wherein the drier is selected from the group consisting of the octoates, resinates, naphthenates, neodecanoates, tallates and linoleates and mixtures thereof of metals selected from the group consisting of cobalt, magnesium, manganese, zinc, cerium, zirconium and mixtures thereof.

14. The ink of claim 1 including a drier activator comprising 2,2'-bipyridyl.

15. The method of forming a water-based heatset intaglio printing ink consisting essentially of:

preparing a resin composition by adding a) a resin present in an amount of about 15 to 40 wt. %, based on the weight of the ink, comprising the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%—said ester having an acid number below about 10, and (ii) about 35–25 parts per hundred of a mixture of about 20–28% of one or more unsaturated monobasic acids having a polymerizable double bond and about 80–72% of one or more other reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8:

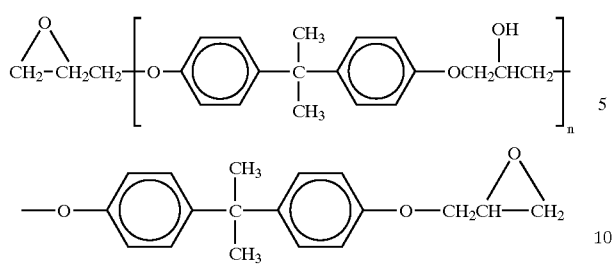

with b) at least one glycol and/or glycol ether present in an amount of about 10 to 30 wt. % based on the weight of the ink, c) at least one inorganic and/or organic pigment present in an amount of about 3 to 30 wt. %, based on the weight of the ink, and d) water, present in an amount of about 5 to 20 wt. %, based on the weight of the ink;

neutralizing the resin composition by adding at least one monoalkanolamine having 2 to 8 carbon atoms, wherein the amino group is a primary, secondary or tertiary amino group, said monoalkanolamine being present in an amount of about 0.1 to 10 wt. %, based on the weight of the ink; and adding at least one drier, present in an amount of about 0.1 to 5 wt. %, based on the weight of the ink.

16. A method for printing with an intaglio printing ink, using the water-based intaglio printing ink of claim 15.

* * * * *